(No Model.)

A. SCHNEIDER & B. HECHT.
TRUCK.

No. 599,917. Patented Mar. 1, 1898.

WITNESSES:
Bruno von Bützingslöwen
Geo. W. Jaekel.

INVENTORS
Adolph Schneider
BY and Berthold Hecht
Bruck Raegener
ATTORNEYS.

UNITED STATES PATENT OFFICE.

ADOLPH SCHNEIDER AND BERTHOLD HECHT, OF BROOKLYN, NEW YORK.

TRUCK.

SPECIFICATION forming part of Letters Patent No. 599,917, dated March 1, 1898.

Application filed October 13, 1897. Serial No. 655,023. (No model.)

*To all whom it may concern:*

Be it known that we, ADOLPH SCHNEIDER and BERTHOLD HECHT, citizens of the United States, residing at Brooklyn, in the county of Kings and State of New York, have invented certain new and useful Improvements in Trucks for Stoves and other Articles, of which the following is a specification.

This invention relates to an improved truck which is intended for use by wholesale and retail dealers in cooking and heating stoves, refrigerators, &c., so as to enable them to effect their removal with great facility from place to place in the store or from the inside to the outside of the same and back again into the store or to the storage-rooms, the truck enabling one person to move large and heavy stoves from place to place; and the invention consists of a truck for moving stoves or similar heavy articles which comprises a wheeled base-frame, a movable frame parallel therewith, pivot-links connecting the rear axle of the wheeled base-frame with the movable frame, elbow-levers fulcrumed to the front axle and pivoted to the front ends of the movable frame, said elbow-levers being provided with a handle that serves for moving the truck as well as for raising or lowering the movable frame, and a locking-bar pivoted at its rear end to the pivot of the pivot-links and provided with a loop or catch for engaging the front axle and an upwardly-extending handle portion in front of said catch.

The invention consists, further, of a stove-truck provided with supplemental bars hinged to and adapted to rest either upon the longitudinal frame-bars of the upper or movable frame or upon transverse rods of said frame, as will be more fully described hereinafter and finally pointed out in the claims.

Figure 1:
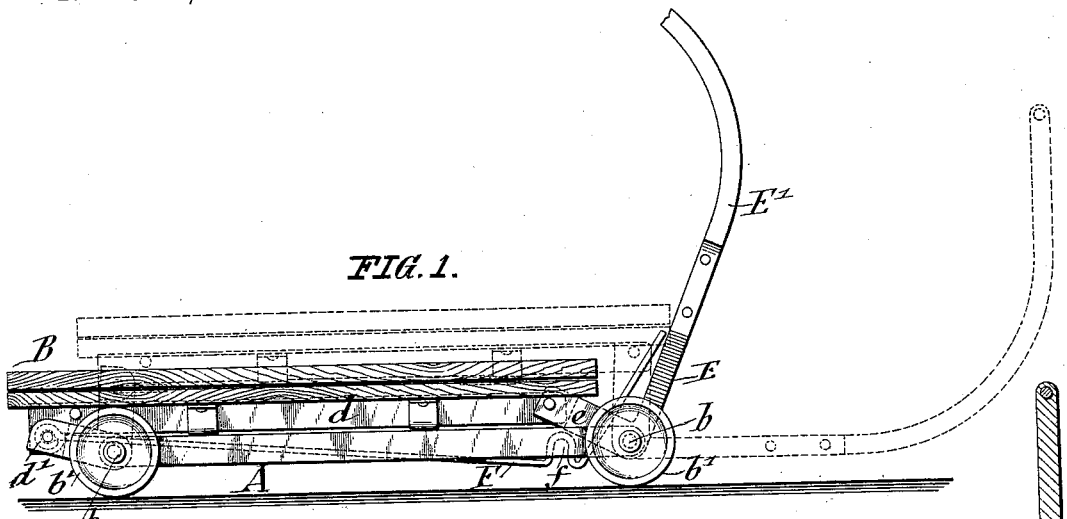
Figure 2:
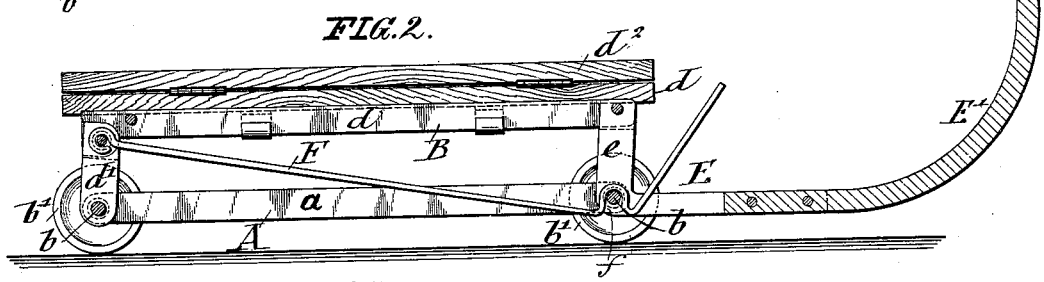
Figure 3:
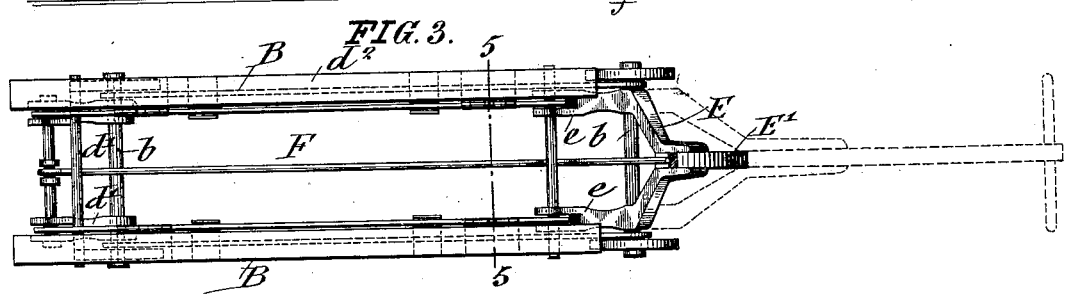
Figure 4:
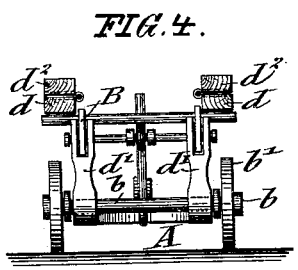
Figure 5:
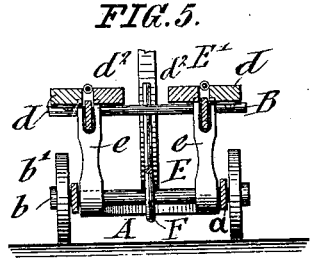

In the accompanying drawings, Figure 1 represents a side elevation of our improved truck for moving stoves and similar articles, showing the same in lowered position in full lines and in its raised position in dotted lines. Fig. 2 is a vertical longitudinal section of the truck. Fig. 3 is a top view. Fig. 4 is a rear elevation of the truck, and Fig. 5 is a vertical transverse section on the line 5 5 of Fig. 3.

Similar letters of reference indicate corresponding parts.

Referring to the drawings, A represents a wheeled base-frame, which consists of longitudinal parallel bars $a$, that are applied to transverse axles $b$, having wheels or rollers $b'$. On the wheeled base-frame A is supported a movable frame B, which is composed of parallel bars $d$, the rear ends of which extend for a short distance in downward direction and are connected by pivot-links $d'$ with the hind axle $b$, while the front ends of the bars $d$ $d$ are pivoted to arms $e$ of elbow-levers E, which are fulcrumed to the front axle $b$ and provided with a stationary handle E', that is connected to the front ends of the elbow-levers E. The arms $e$ are parallel with the pivot-links $d'$, so that the movable bars $d$ can be readily moved by the handle E' parallel with the lower bars $a$ into downward or folded-up position, as shown in full lines in Fig. 1, or in raised position, as shown in Figs. 1 and 2, the handle E' serving for moving the truck from place to place and as a lever by which the movable frame B is operated.

A locking-bar F, which is shown plainly in Figs. 1, 2, and 3, is hinged at its rear end to the upper pivot-rod of the links $d'$ and is provided at its front portion with a loop or catch $f$, formed in the rod and adapted to engage with the front axle of the truck, the forward end of said locking-bar being extended in an upward direction, so as to afford a convenient handle.

In the operation of elevating and moving a stove or other article the truck is wheeled in its lowered position, as shown in Fig. 1, beneath the object, which stands raised from the floor upon its legs sufficiently to allow the truck to pass beneath the base and between the legs. The handle E' is then depressed, thereby moving forward and upward the upper or movable truck-frame by means of the elbow-levers $e$ and the links $d'$, which are raised into upright position, but slightly beyond the vertical transverse planes passing through the axles. The loop or catch $f$ of the handle portion of the locking-rod F then rides over and engages the front axle, when the truck is raised to its full elevation, thereby securely locking the entire structure in the raised position and holding it firmly while the truck, with its load, which has now been raised clear of the floor, is wheeled to the desired location. To lower the truck and deposit the stove on the floor, it is only necessary to grasp the handle portion of the locking-bar and lift it in an upward direction. The loop or catch $f$ is thereby disengaged from its connection with the front axle and the upper frame descends by gravity under the control of the operator by means of the handle $E'$, lowering the stove until its legs rest upon the floor, when the truck may be withdrawn from beneath it in the position first shown.

In order to adapt the truck for use with articles whose base may be at a greater or less height from the floor, the supplemental bars $d^2$, of wood or other suitable material and of any desired thickness, are hinged to the parallel longitudinal frame-bars $d$ of the upper or movable frame at the upper and inner edges of said bars $d$, as shown clearly in Figs. 4 and 5. Fig. 4 shows these supplemental bars folded and resting upon the upper surface of the frame-bars $d$, thereby increasing the platform height of the truck. In Fig. 5 the bars are shown in open position, lying upon the end supports of the upper or movable frame. When in this position, the supplemental bars $d^2$ add to the surface upon which the stove or other loaded object rests, thus adding to the durability of the truck. Their primary object, however, is to afford a substitute for the boards or blocks which would otherwise be necessary in order to use the truck in connection with articles whose base height from the floor is above the level of the frame-bars $d$ when the truck is elevated. They thus add measurably to the utility of the truck, and their novel attachment thereto permits of their additional usefulness when made of the same height as the main frame-bars $d$.

Having thus described our invention, we claim as new and desire to secure by Letters Patent—

1. A truck for moving stoves, consisting of a wheeled base-frame, a movable frame, pivot-links connecting the movable frame with the rear axle of the base-frame, a locking-bar pivoted at its rear end to the transverse pivot of the said pivot-links and provided with a loop or catch adapted to engage with the front axle and a handle portion extending beyond the same, elbow-levers pivoted to the front axle and pivoted to the front end of the movable frame and a lever-handle connected with said elbow-levers, substantially as set forth.

2. A truck for moving stoves, consisting of a wheeled base-frame, a movable frame pivotally connected therewith and provided with longitudinal bars and transverse supporting-rods, elbow-levers pivoted to the front end of the movable frame, a lever-handle connected with said elbow-levers, and supplemental bars hinged alongside of the longitudinal bars of the movable frame and adapted to be placed on said bars or alongside of the same on said rods, substantially as set forth.

In testimony that we claim the foregoing as our invention we have signed our names in presence of two subscribing witnesses.

ADOLPH SCHNEIDER.
BERTHOLD HECHT.

Witnesses:
PAUL GOEPEL,
GEO. W. JAEKEL.